US012764816B2

(12) United States Patent
Dong

(10) Patent No.: US 12,764,816 B2
(45) Date of Patent: Oct. 13, 2026

(54) METHOD FOR COMMUNICATION ON MULTIPLE LINKS AND ELECTRONIC DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/291,512

(22) PCT Filed: Jul. 28, 2021

(86) PCT No.: PCT/CN2021/109052
§ 371 (c)(1),
(2) Date: Jan. 23, 2024

(87) PCT Pub. No.: WO2023/004643
PCT Pub. Date: Feb. 2, 2023

(65) Prior Publication Data
US 2025/0031260 A1 Jan. 23, 2025

(51) Int. Cl.
*H04W 76/15* (2018.01)
*H04W 76/11* (2018.01)

(52) U.S. Cl.
CPC ............ *H04W 76/15* (2018.02); *H04W 76/11* (2018.02)

(58) Field of Classification Search
CPC ........... H04W 12/0433; H04W 12/041; H04W 12/06; H04W 84/12; H04W 48/16; H04W 8/005
See application file for complete search history.

(56) References Cited

U.S. PATENT DOCUMENTS

| | | | | |
|---|---|---|---|---|
| 2021/0211871 | A1* | 7/2021 | Chu | H04W 12/06 |
| 2022/0124857 | A1* | 4/2022 | Patil | H04W 76/14 |
| 2023/0371102 | A1* | 11/2023 | Shafin | H04W 8/24 |

FOREIGN PATENT DOCUMENTS

| | | | |
|---|---|---|---|
| EP | 2497286 | B1 | 3/2018 |
| WO | WO 2021011427 | A1 | 1/2021 |

OTHER PUBLICATIONS

Patil et al. "Resolution for CIDs related to TDLS (CC34)", IEEE P802.1, Mar. 2021, 10 pages.
European Patent Application No. 21951257.1 Search Report dated Jul. 29, 2024, 9 pages.
PCT/CN2021/109052, International Search Report dated Mar. 28, 2022, 2 pages.

* cited by examiner

*Primary Examiner* — Iqbal Zaidi
(74) *Attorney, Agent, or Firm* — Cozen O'Connor

(57) ABSTRACT

A method for communication on multiple links, performed by a tunneled direct link setup (TDLS) initiator, the method including: determining a first message frame on one of the multiple links, in which the first message frame includes information for implementing a TDLS function on at least one of the multiple links, that is, TDLS information; and transmitting the first message frame.

16 Claims, 2 Drawing Sheets

METHOD FOR COMMUNICATION ON MULTIPLE LINKS AND ELECTRONIC DEVICE

CROSS-REFERENCE TO RELATED APPLICATION

This application is a national phase of International Application No. PCT/CN2021/109052, filed on Jul. 28, 2021, the entire content of which is incorporated herein by reference.

TECHNICAL FIELD

The disclosure relates to the field of wireless communication, and more specifically to a method and a device for communication on multiple links.

BACKGROUND

At present, the study scope of the wireless fidelity (Wi-Fi) technology is 320 MHz bandwidth transmission, aggregation and coordination of multiple frequency bands, etc. It is predicted that the speed and throughput may be increased by at least four times as compared with existing standard. The main application scenarios of this increase in speed and throughput are in video transmission, augmented reality (AR), virtual reality (VR), etc.

The aggregation and coordination of multiple frequency bands mean that devices communicate with each other on frequency bands of 2.4 GHz, 5.8 GHZ, and 6 GHz simultaneously. For simultaneous communication among devices on multiple frequency bands, a new media access control (MAC) mechanism needs to be defined to manage the simultaneous communication. In addition, the aggregation and coordination of multiple frequency bands is expected to support low-latency transmission.

A current maximum bandwidth to be supported in the aggregation and coordination of multiple frequency bands is 320 MHz (160 MHz+160 MHz), in addition to 240 MHz (160 MHz+80 MHz) and other bandwidths.

In the related art, a station (STA) and an access point (AP) may be a multi-link device (MLD), i.e., a device supports a capability to simultaneously transmit and/or receive on multiple links at the same moment.

SUMMARY

A method for communication on multiple links is provided. The method includes: determining a first message frame on one of the multiple links, in which the first message frame includes information for implementing a tunneled direct link setup (TDLS) function on at least one of the multiple links; and transmitting the first message frame.

A method for communication on multiple links is provided. The method includes: receiving a first message frame on one of the multiple links, in which the first message frame includes information for implementing a TDLS function on at least one of the multiple links; and performing a communication operation based on the first message frame.

An electronic device is provided. The electronic device includes a memory, a processor, and a computer program stored on the memory and runnable on the processor. When the computer program is executed by the processor, the method as described above is performed.

BRIEF DESCRIPTION OF THE DRAWINGS

The above and additional features of the embodiments of the disclosure will become more apparent by describing the embodiments of the disclosure in detail with reference to the accompanying drawings, in which.

DETAILED DESCRIPTION

The following descriptions with reference to the accompanying drawings are provided to fully understand the various embodiments of the disclosure as defined by the appended claims and their equivalents. The various embodiments of the disclosure include various specific details, but such specific details are considered to be exemplary only. In addition, descriptions of well-known techniques, functions and constructions may be omitted for the sake of clarity and brevity.

Terms and words used in the disclosure are not limited to written meanings, but are used by inventors to enable a clear and consistent understanding of the disclosure. Therefore, for those skilled in the art, the descriptions of various embodiments of the disclosure are provided only for the purpose of illustration, but not for the purpose of limitation.

It should be understood that "a", "an", "said", and "the" in singular forms used herein may also include plural forms, unless clearly indicated in the context otherwise. It should be further understood that the word "include" used in the disclosure refers to the existence of described features, integers, steps, operations, elements, and/or assemblies, but does not exclude the existence or addition of one or more other features, integers, steps, operations, elements, assemblies, and/or groups thereof.

It will be understood that although the terms "first" and "second" and the like may be used herein to describe various elements, these elements should not be limited by these terms. These terms are only used to distinguish one element from another. Therefore, a first element discussed below may be referred to as a second element without departing from the teaching of the embodiments.

It should be understood that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items. Unless otherwise defined, all terms used herein, including technical terms and scientific terms, have the same meaning as generally understood by those skilled in the art to which this disclosure belongs.

Figure 1:
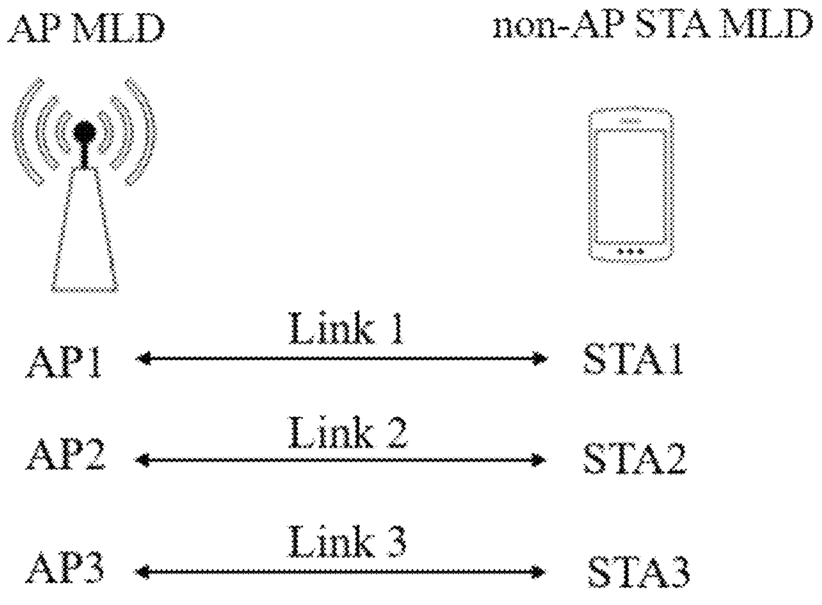
FIG. 1 is an example diagram illustrating a communication scenario on multiple links according to some embodiments.

FIG. 1 is an example diagram illustrating a communication scenario on multiple links according to some embodiments.

In a wireless local area network, a basic service set (BSS) may include an access point (AP) and one or more stations (STAs) that communicate with the AP. The BSS may be connected to a distribution system (DS) through its AP and then accessed to another BSS, to form an extended service set (ESS).

The AP is a wireless switch of the wireless network or an access device of the wireless network. The AP device may be used as a wireless base station and mainly as a bridge to connect the wireless network and a wired network. The wired network and the wireless network are integrated using the AP.

The AP may include software applications and/or circuitries to enable other types of nodes in the wireless network to communicate with outside and inside of the wireless network via the AP. For example, the AP may be a terminal device or a network device equipped with a wireless fidelity (Wi-Fi) chip.

For example, the STAs may include, but are not limited to: cellular phones, smart phones, wearable devices, computers, personal digital assistants (PDAs), personal communication system (PCS) devices, personal information managers (PIMs), personal navigation devices (PNDs), global positioning systems, multimedia devices, Internet of Things (IoT) devices, and the like.

In some embodiments of the disclosure, the AP and the STA may support a multi-link device (MLD), which may, for example, be denoted as AP MLD and non-AP STA MLD, respectively. For ease of description, in the following context, example communication between an AP and a STA on multiple links is primarily described, which is not limited in some embodiments.

In FIG. 1, by way of illustration only, an AP MLD may be an AP supporting an ML communication function and a non-AP STA MLD may be an STA supporting an ML communication function. Referring to FIG. 1, the AP MLD may operate on three links, such as affiliate AP1, AP2, and AP3 illustrated in FIG. 1, and the non-AP STA MLD may also operate on three links, such as affiliate STA1, STA2, and STA3 illustrated in FIG. 1. In FIG. 1, for example, AP1 communicates with STA1 via Link1, similarly, AP2 communicates with STA2 via Link2, and AP3 communicate with STA3 via Link3, respectively. In addition, Link1 to Link3 may be multiple links at different frequencies, e.g., links at 2.4 GHz, 5 GHZ, and 6 GHZ, etc., or several links with same or different bandwidths at 2.4 GHz, 5 GHZ and 6 GHz. Moreover, there may be multiple channels on each link. However, it should be understood that the communication scenario in FIG. 1 is only exemplary and the inventive concept is not limited thereto. For example, the AP MLD may be connected to multiple non-AP STA MLDs, or the AP may communicate with other types of STAs on each link.

Figure 2:
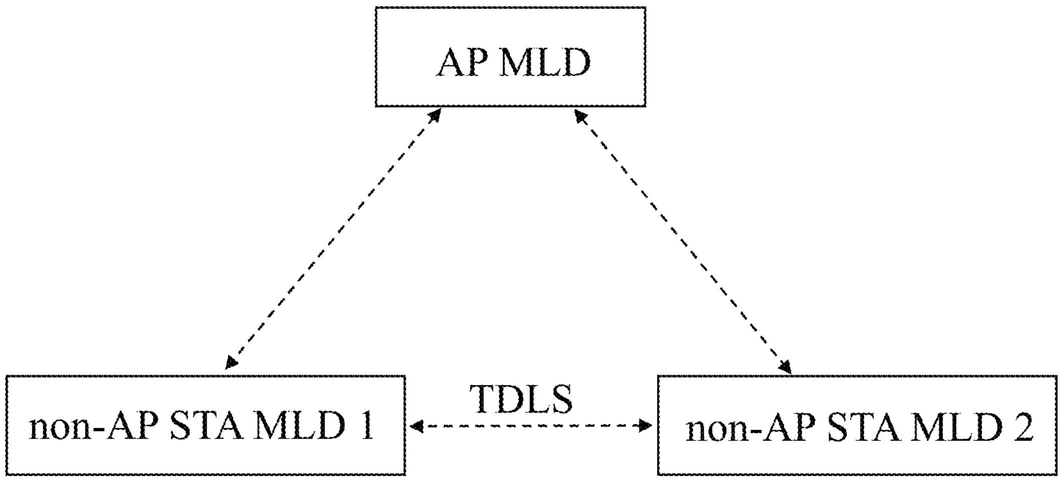
FIG. 2 is an example diagram illustrating a TDLS according to some embodiments.

In order to improve the transmission efficiency, the non-AP STA MLD may support a tunneled direct link setup (TDLS) function. As illustrated in FIG. 2, FIG. 2 is an example diagram illustrating a TDLS according to some embodiments.

As illustrated in FIG. 2, the TDLS may be achieved between a first non-AP STA MLD, i.e., a non-AP STA MLD 1 and a second non-AP STA MLD, i.e., a non-AP STA MLD 2, so that communication (for example, data transmission) may be performed directly between the non-AP STA MLD 1 and the non-AP STA MLD 2, without the AP MLD. It will be understood that, although in FIG. 2, the non-AP STA MLD 1 and the non-AP STA MLD 2 are connected to the same AP MLD, which is not limited in the disclosure. For example, the non-AP STA MLD 1 and the non-AP STA MLD 2 are respectively connected to different AP MLDs.

One of the non-AP STA MLD 1 and the non-AP STA MLD 2 may be taken as a TDLS initiator to carry out a TDLS discovery request, the other one of the non-AP STA MLD 1 and the non-AP STA MLD 2 may be taken as a TDLS responder to carry out a TDLS discovery response, and a TDL is set up between the non-AP STA MLD 1 and the non-AP STA MLD 2 in a TDLS process. For example, the TDLS process may include a TDLS setup request, a TDLS setup response, and a TDLS setup confirm.

However, an 802.11be device supports the ML communication, and an existing TDLS standard only supports a single-link setup and only supports the single-link setup and performs the communication. For example, after an ML setup is completed between the non-AP STA MLD and the AP MLD, if the TDLS communication is performed, a TDLS discovery request frame needs to be transmitted on each link based on the existing standard, which results in an overlong TDLS connecting duration and being not beneficial to the spectrum utilization.

Figure 3:
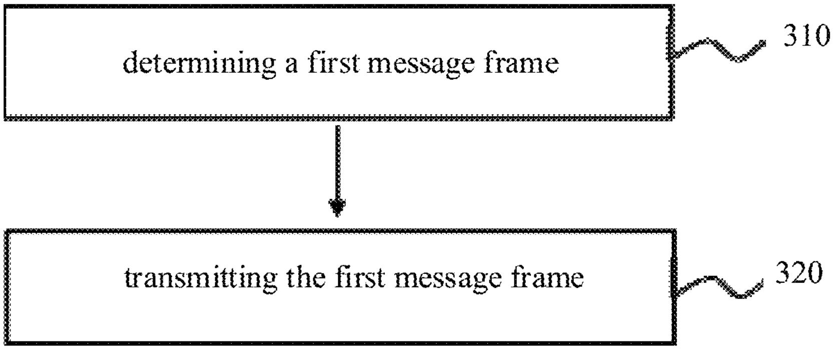
FIG. 3 is a flowchart illustrating a method for communication on multiple links according to some embodiments.

FIG. 3 is a flowchart illustrating a method for communication on multiple links according to some embodiments. The method for communication as illustrated in FIG. 3 is applicable to a TDLS initiator. The TDLS initiator may be any affiliate STA in the STAs support the ML communication, such as the non-AP STA MLD 1 as illustrated in FIG. 2.

As illustrated in FIG. 3, at step 310, a first message frame is determined on one of the multiple links. According to some embodiments of the disclosure, the first message frame may include information for implementing a TDLS function on at least one of the multiple links (referred to as "TDLS information" for convenience of description).

In some embodiments of the disclosure, the multiple links may refer to multiple links supported by the TDLS initiator for communication at different frequency bands (for example, Link 1, Link 2, and Link 3 in FIG. 1). Only as a descriptive example, the first message frame may be a TDLS discovery request frame, but is not limited in the disclosure, and other frames capable of initiating the TDLS are feasible.

In some embodiments of the disclosure, there are many ways for determining the first message frame. For example, the first message frame may be generated based on at least one of: a network condition, a load condition, a hardware capability of a transmitting/receiving device, a service type, or a related protocol provision, which are not specifically limited in the embodiments of the disclosure. In some embodiments of the disclosure, the first message frame may be further obtained from an external device, which is not specifically limited in the embodiments of the disclosure.

According to the embodiments of the disclosure, the TDLS initiator may carry TDLS information in the first message frame (for example, the TDLS discovery request frame), and may, on one link, set up the TDLS on at least one of the multiple links (one or more). The at least one of the multiple links may be referred to as at least one TDLS link for convenience of description. For this purpose, the TDLS information may carry information related to at least one link realizing the TDLS (at least one TDLS link).

The TDLS information may be carried in the first message frame (for example, the TDLS discovery request frame) in the form of an information element (IE), but is not limited in the disclosure and may be carried in any other feasible ways. The TDLS information is described in the form of the IE for convenience of description below.

According to some embodiments of the disclosure, the first message frame (for example, the TDLS discovery request frame) may include a link identifier IE, and the format of the link identifier IE may be as illustrated in Table 1.

TABLE 1

| link identifier IE format | | | | | | | | |
|---|---|---|---|---|---|---|---|---|
| Element ID | Length | BSSID1/ Link ID1 | TDLS initiator STA MAC address1 | TDLS responder STA MAC address1 | BSSID2/ Link ID2 | TDLS initiator STA MAC address2 | TDLS responder STA MAC address2 | . . . |

Referring to Table 1, the link identifier IE may include an element ID for identifying the link identifier IE, a length field representing length information of the link identifier IE, and the TDLS information corresponding to at least one TDLS link. The TDLS information corresponding to two TDLS links is shown in Table 1, but is not limited in the disclosure. The TDLS information in Table 1 may be changed based on the different number of links required to implement the TDLS.

According to some embodiments of the disclosure, the TDLS information may include a media access control (MAC) address of a TDLS initiator (e.g., TDLS initiator STA MAC address 1 and TDLS initiator STA MAC address 2 in Table 1) and an MAC address of a TDLS responder (e.g., TDLS responder STA MAC address 1, TDLS responder STA MAC address 2 in Table 1) on each of the at least one TDLS link.

Each STA affiliated to the same non-AP STA MLD has a unique MAC address on each link. The TDLS link may be indicated by carrying the MAC address of the TDLS initiator and the MAC address of the responder.

According to some embodiments of the disclosure, the TDLS information may include a basic service set identifier or a link identifier respectively corresponding to the at least one TDLS link, for example, BSSID 1/Link ID 1 and BSSID 2/Link ID 2 in Table 1.

The basic service set identifier (BSSID) may indicate an identifier of a BSS to which the TDLS initiator on each of the at least one of the multiple links belongs. Each AP affiliated to the same AP MLD has a unique BSSID and the STA(s) connected to this AP may correspond to BSSID of this AP. In other words, the BSSID may indicate a BSSID of the AP associated with the TDLS initiator on a corresponding link. Therefore, at least one TDLS link may be identified by carrying at least one BSSID (BSSID1, BSSID2).

The link identifier (link ID) may have multiple bits, to identify combination information of a working spectrum, a bandwidth/channel, and/or a BSSID. The at least one TDLS link may be identified by carrying at least one link ID (Link ID1, Link ID2).

Different affiliated STAs (for example, STAs affiliated to different non-AP STA MLDs) may be allocated to the same MAC address. Therefore, in order to indicate the TDLS initiator and the TDLS responder clearly to ensure efficiently implementing the TDLS function, the BSSID or the link ID corresponding to the TDLS link may be carried other than the MAC address of the TDLS initiator and the MAC address of the TDLS responder on each TDLS link.

According to some embodiments of the disclosure, TDLS information on at least part link in the at least one TDLS link may be included in the link identifier IE.

In some embodiments of the disclosure, the link identifier IE may be redefined as illustrated in Table 1, so that the TDLS information corresponding to all the at least one TDLS link (for example, the MAC address of the TDLS initiator and the MAC address of the TDLS responder, and/or the BSSID/Link ID) is carried in the link identifier IE. Information of all TDLS links may be carried in the same IE, and information transmission may be performed in a simple encoding and decoding mode.

In some embodiments of the disclosure, the link identifier IE may only include information of at least part of TDLS links (for example, the MAC address of the TDLS initiator and the MAC address of the TDLS responder and/or the BSSID/Link ID on one TDLS link), and information of other TDLS link(s) may be carried in other position(s) of the first message frame. For example, the first message frame may include an ML IE, and TDLS information on at least part link in the at least one TDLS link may be included in the ML IE of the first message frame. That is, information of part of the TDLS links may be carried in the link identifier IE, or information of part of the TDLS links may be carried in the ML IE. In this case, when the first message frame is implemented by the TDLS discovery request frame and may have following format as shown in Table 2.

TABLE 2

| TDLS discovery request frame definition | |
|---|---|
| Order | Information |
| 1 | Category |
| 2 | TDLS action |
| 3 | Dialog token |
| 4 | Link identifier element/Link identifier element for multi-link |
| 5 | Multi-band |
| 6 | ML element |

In Table 2, the order may identify a sequence of each information field in the TDLS discovery request frame. The category field may identify a mechanism of each management action. For example, when the category field is set to a specific value (for example, 12), a TDLS mechanism may be identified. The TDLS action field may be set to various values to distinguish different TDLS actions. For example, when the TDLS action field is set to a specific value (for example, 10), a TDLS discovery request may be identified. The dialog token field may be configured to match a TDLS discovery response frame with a TDLS discovery request frame. The link identifier element/link identifier element for multi-link may include information of part of TDLS links (for example, information of one TDLS link) described above. The multi-band field may selectively exist based on the settings of the source language. The ML element may include information of part of TDLS links (for example, information of other TDLS link(s) than the information of part of TDLS links included in the link identifier element). For example, a MAC address and/or a link ID of a TDLS responder on a corresponding TDLS link is at least included in a per-STA profile of the ML element, but is not limited in the disclosure. A MAC address and/or a link ID of a TDLS initiator may be further included in the per-STA profile of the ML element.

In Table 2, the link identifier element/link identifier element for multi-link may maintain an original format, for example, includes information of one TDLS link, and information of other TDLS link(s) may be carried in the ML element. Such a design may increase the compatibility and flexibility of the system.

The TDLS information carried in the link identifier element and/or the ML element as shown in Table 1 and Table 2 are only illustrative, which is not limited in the disclosure. For example, the TDLS information may have content different than what are shown in Table 1 and Table 2. For example, in some embodiments of the disclosure, the TDLS information may include an AP MLD MAC address, a link bitmap, a TDLS initiator non-AP STA MLD MAC address, and a TDLS responder non-AP STA MLD MAC address. In this case, the TDLS information may be carried in the link identifier IE in the format as shown in Table 3.

transmitted on each link, but the TDLS on at least one link (preferably, multiple links) may be set up by one TDLS discovery request frame on one link, thereby shortening the duration when the TDLS link is set up, implementing the efficient spectrum utilization, and being beneficial to power saving.

Figure 4:
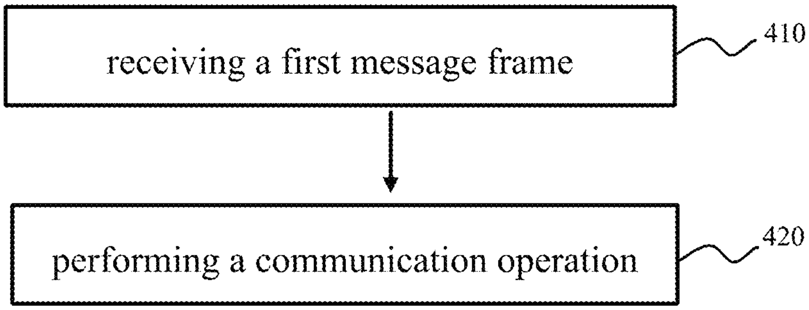
FIG. 4 is flowchart illustrating another method for communication on multiple links according to some embodiments.

FIG. 4 is flowchart illustrating another method for communication on multiple links according to embodiments. The method for communication as illustrated in FIG. 4 is applicable to a TDLS responder. The TDLS responder may respond to the first message frame (the TDLS discovery request frame) in FIG. 3 and may be any affiliated STA in the STA(s) that perform the TDLS communication with the TDLS initiator (for example, the non-AP STA MLD 2 in FIG. 2). In some embodiments, as shown in FIG. 2, the TDLS responder may be connected to the same AP MLD with the TDLS initiator; in other embodiments, the TDLS responder may be connected to different AP MLDs with the TDLS initiator.

Referring to FIG. 4, at step 410, a first message frame is received on one of the multiple links. The first message

TABLE 3

| link identifier IE format | | | | | |
|---|---|---|---|---|---|
| Element ID | Length | AP MLD MAC address | Link bitmap | TDLS initiator non-AP STA MLD MAC address | TDLS responder non-AP STA MLD address |

In Table 3, the link bitmap may be set to a specific value (for example, 1) to identify setting up a TDLS link.

The TDLS information may be carried in the link identifier IE as shown in Table 3, and a TDLS link may be set up between two non-AP STA MLDs linked to the same AP MLD (the non-AP STA MLD1 and the non-AP STA MLD2 as shown in Table 2), and the TDLS link set up may correspond to multiple links supported by two non-AP STA MLDs. The TDLS information as shown in Table 3 may rapidly and simply implement the TDLS link(s).

The format as shown in Table 3 is only illustrative, but is not limited to the disclosure. Table 3 may be transformed in various ways. For example, Table 3 may include multiple AP MLD MAC addresses, multiple TDLS initiator non-AP STA MLD MAC addresses, and multiple TDLS responder non-AP STA MLD MAC addresses. In other words, TDLS link(s) may be set up between non-AP STA MLDs connected to different AP MLDs. In addition, it may be understood that elements as shown in Table 1 to Table 3 independently exist, and are listed in the same Table exemplarily, but do not represent all elements in the table must exist simultaneously as shown in Table. Values of the elements do not depend on any other elements in the table. Therefore, those skilled in the art may understand that a value of each element in the table is an independent embodiment.

As illustrated in FIG. 3, at step 320, a first message frame may be transmitted. Any STA affiliated to the same non-AP STA MLD may transmit the first message frame (the TDLS discovery request frame) on any one link. For example, it may be determined that the first message frame may be transmitted on the link of the first message frame at step 310, but is not limited in the disclosure. The first message frame may be transmitted on other links different from the link of the first message frame for determining at step 310.

In the method for communication on multiple links in embodiments of the disclosure, after the non-AP STA MLD and the AP MLD complete the ML setup, if the TDLS communication needs to be performed on the multiple links, the TDLS discovery request frame does not need to be frame may include information for implementing a TDLS function on at least one of the multiple links, that is, TDLS information.

According to some embodiments of the disclosure, the TDLS information may include a basic service set identifier or a link identifier respectively corresponding to the at least one link.

According to some embodiments of the disclosure, the TDLS information includes an MAC address of a TDLS initiator and an MAC address of a TDLS responder on each of the at least one of the multiple links.

According to some embodiments of the disclosure, the basic service set identifier indicates an identifier of a basic service set to which the TDLS initiator on each of the at least one of the multiple links belongs.

According to some embodiments of the disclosure, the first message frame includes a link identifier information element. TDLS information on at least part link in the at least one of the multiple links is included in the link identifier information element.

According to some embodiments of the disclosure, the first message frame includes a multi-link information element. TDLS information on at least part link in the at least one of the multiple links is included in the multi-link information element of the first message frame.

The first message frame, the TDLS information, the link identifier information element, the multi-link information element as illustrated in FIG. 4 may be similar to embodiments as illustrated FIG. 3 and Table 1 to Table 3, which will be omitted for conciseness.

At step 420, a communication operation may be performed based on the first message frame. For example, the TDLS responder may set up and start the TDLS communication operation on a corresponding link with the TDLS initiator based on the TDLS information carried in the first message frame.

Figure 5:
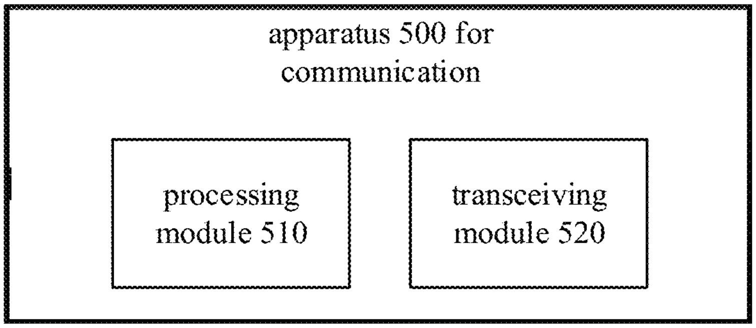
FIG. 5 is a block diagram illustrating an apparatus for communication on multiple links according to some embodiments.

FIG. 5 is a block diagram illustrating an apparatus for communication according to some embodiments of the disclosure.

As illustrated in FIG. 5, the apparatus 500 for communication may include a processing module 510 and a transceiving module 520. The apparatus for communication as illustrated in FIG. 5 is applicable to a TDLS initiator or a TDLS responder.

When the apparatus 500 for communication as illustrated in FIG. 5 is applicable to the TDLS initiator, the processing module 510 may be configured to determine a first message frame on one of the multiple links. The first message frame includes information for implementing a TDLS function on at least one of the multiple links information. The transceiving module 520 may be configured to transmit the first message frame. In this case, the apparatus 500 for communication may perform the method for communication as illustrated in FIG. 3, and the first message frame and the information included in the first message frame may be similar to embodiments as described in FIGS. 1 to 3, which will be omitted for conciseness.

When the apparatus 500 for communication as illustrated in FIG. 5 is applicable to the TDLS responder, the transceiving module 520 may be configured to receive a first message frame on one of the multiple links. The first message frame includes information for implementing a TDLS function on at least one of the multiple links. The processing module 510 may be configured to perform a communication operation based on the first message frame. In this case, the apparatus 500 for communication may perform the communication method as illustrated in FIG. 4, and the first message frame and information included in the first message frame may be similar to embodiments as described in FIGS. 1 to 3, which will be omitted for conciseness.

In addition, the apparatus 500 for communication as illustrated in FIG. 5 is only illustrative, which will not be limited in embodiments of the disclosure. For example, the apparatus 500 for communication may further include other modules, for example, a memory module. In addition, modules in the apparatus 500 for communication may be combined into a more complex module or may be divided into more independent modules.

The method and the apparatus for communication on multiple links according to embodiments of the disclosure are applicable to a TDLS mechanism in the ML communication, which improves the spectrum utilization.

Based on the same principles as the method provided in the embodiments of the disclosure, the embodiments of the disclosure also provide an electronic device including a processor and a memory. The machine readable instructions (which may also be referred to as "a computer program") are stored on the memory. The processor is configured to execute the machine readable instructions to perform the method described with reference to FIGS. 3 and 4.

The embodiments of the disclosure also provide a computer-readable storage medium having a computer program stored thereon. When the computer program is executed by a processor, the method described with reference to FIGS. 3 and 4 is performed.

In some embodiments, the processor may be a logic box, a module, or a circuit, for implementing or executing various embodiments described in the disclosure, for example, a Central Processing Unit (CPU), a general processor, a Digital Signal Processor (DSP), an Application Specific Integrated Circuit (ASIC), a Field Programmable Gate Array (FPGA) or other programmable logic devices, a transistor logic device, a hardware component, or any combination thereof. The processor may also be a combination used to implement a computing function, for example, a combination consisting of one or more microprocessors, and a combination consisting of DSPs and microprocessors.

In some embodiments, the memory may be, for example, a Read Only Memory (ROM), a Random Access Memory (RAM), an Electrically Erasable Programmable Read Only Memory (EEPROM), a Compact Disc Read Only Memory (CD-ROM) or other optical disc memories, optical disk memories (including compact disc, laser disc, CD-ROM, digital general disc, and Blu-ray disc), disk storage mediums or other magnetic storage devices, or any other medium that can be used to carry or store program codes in the form of instructions or data structures and can be accessed by a computer, which is not limited herein.

It should be understood that although steps in the flowchart of the accompanying drawings are illustrated sequentially as indicated by the arrows, the steps are not necessarily performed sequentially in the order indicated by the arrows. Unless explicitly stated otherwise in the disclosure, there is no strict sequential limitation on the execution of these steps, which may be performed in any other order. In addition, at least some of the steps in the flowchart of the accompanying drawings may include a plurality of sub-steps or a plurality of phases, which are not necessarily executed at the same time, but may be executed at different times. The execution order is not necessarily sequential, and the steps can be performed alternately or alternatively with other steps or at least part of sub-steps or phases of other steps.

Although the disclosure has been illustrated and described with reference to the embodiments of the disclosure, it will be understood by those skilled in the art that various changes in form and detail can be made without departing from the scope of the disclosure. Accordingly, the scope of the disclosure should not be limited by the embodiments, but should be defined by the appended claims and their equivalents.

What is claimed is:

1. A method for communication on multiple links, performed by a tunneled direct link setup (TDLS) initiator, the method comprising:

determining a tunneled direct link setup (TDLS) discovery request frame on one of the multiple links, wherein the TDLS discovery request frame comprises information for implementing a TDLS function on at least one of the multiple links, the TDLS discovery request frame further comprises a link identifier information element, the link identifier information element comprises a basic service set identifier corresponding to each of the at least one of the multiple links, the TDLS discovery request frame further comprises a media access control (MAC) address of a multi-link device (MLD), and the MAC address of the MLD is used to identify an initiator of a TDLS discovery request; and transmitting the TDLS discovery request frame.

2. The method according to claim 1, wherein the TDLS information comprises a basic service set identifier or a link identifier corresponding to each of the at least one of the multiple links.

3. The method according to claim 1, wherein the TDLS information comprises a media access control (MAC) address of the TDLS initiator and an MAC address of a TDLS responder on each of the at least one of the multiple links.

4. The method according to claim 3, wherein the basic service set identifier indicates an identifier of a basic service set to which the TDLS initiator on each of the at least one of the multiple links belongs.

5. The method according to claim 3, wherein TDLS information on one or more links in the at least one of the multiple links is comprised in the link identifier information element.

6. The method according to claim 3, wherein the TLDS discovery request frame comprises a multi-link information element, wherein TDLS information on one or more links in the at least one of the multiple links is comprised in the multi-link information element of the TLDS discovery request frame.

7. A non-transitory computer-readable storage medium having stored therein instructions that, when executed by a processor of an electronic device, causes the electronic device to perform the method of claim 1.

8. An electronic device, comprising:

a memory for storing a computer program; and a processor, wherein the processor is configured to perform the method of claim 1.

9. A method for communication on multiple links, performed by a tunneled direct link setup (TDLS) responder, the method comprising:

receiving a tunneled direct link setup (TDLS) discovery request frame on one of the multiple links, wherein the TDLS discovery request frame comprises information for implementing a TDLS function on at least one of the multiple links, the TDLS discovery request frame further comprises a link identifier information element, the link identifier information element comprises a basic service set identifier corresponding to each of the at least one of the multiple links the TDLS discovery request frame further comprises a media access control (MAC) address of a multi-link device (MLD), and the MAC address of the MLD is used to identify an initiator of a TDLS discovery request; and performing a communication operation based on the TDLS discovery request frame.

10. The method according to claim 9, wherein the TDLS information comprises a basic service set identifier or a link identifier corresponding to each of the at least one of the multiple links.

11. The method according to claim 9, wherein the TDLS information comprises a media access control (MAC) address of a TDLS initiator and an MAC address of the TDLS responder on each of the at least one of the multiple links.

12. The method according to claim 11, wherein the basic service set identifier indicates an identifier of a basic service set to which the TDLS initiator on each of the at least one of the multiple links belongs.

13. The method according to claim 11, wherein TDLS information on one or more links in the at least one of the multiple links is comprised in the link identifier information element.

14. The method according to claim 11, wherein the TLDS discovery request frame comprises a multi-link information element, wherein TDLS information on one or more links in the at least one of the multiple links is comprised in the multi-link information element of the TLDS discovery request frame.

15. A non-transitory computer-readable storage medium having stored therein instructions that, when executed by a processor of an electronic device, causes the electronic device to perform the method of claim 9.

16. An electronic device, comprising:

a memory for storing a computer program; and a processor, wherein the processor is configured to:

determine a tunneled direct link setup (TDLS) discovery request frame frame on one of multiple links, wherein the TDLS discovery request frame comprises information for implementing a TDLS function on at least one of the multiple links, the TDLS discovery request frame further comprises a link identifier information element, the link identifier information element comprises a basic service set identifier corresponding to each of the at least one of the multiple links, the TDLS discovery request frame further comprises a media access control (MAC) address of a multi-link device (MLD), and the MAC address of the MLD is used to identify an initiator of a TDLS discovery request; and transmit the TDLS discovery request frame.

* * * * *